K. D. SAULPAW.
RESILIENT WHEEL.
APPLICATION FILED JAN. 22, 1913.

1,096,394.

Patented May 12, 1914.

Witnesses

Inventor
Karl D. Saulpaw.
By _____, Attorneys

UNITED STATES PATENT OFFICE.

KARL D. SAULPAW, OF CALHOUN, TENNESSEE.

RESILIENT WHEEL.

1,096,394.  Specification of Letters Patent.  Patented May 12, 1914.

Application filed January 22, 1913. Serial No. 743,528.

*To all whom it may concern:*

Be it known that I, KARL D. SAULPAW, citizen of the United States, residing at Calhoun, in the county of McMinn and State of Tennessee, have invented certain new and useful Improvements in Resilient Wheels, of which the following is a specification.

This invention relates to an improvement in resilient wheels.

The primary object of the present invention is to provide a spring wheel which will have the advantages of a pneumatic tired wheel in being resilient without the disadvantages of punctures or rim cuts.

A further object of the invention is to provide a construction in which the pressure of the load will be taken up by spring spokes, the spokes forming air cushions which take up sudden jarring occasioned by a wheel passing over an obstruction.

Figure 1:
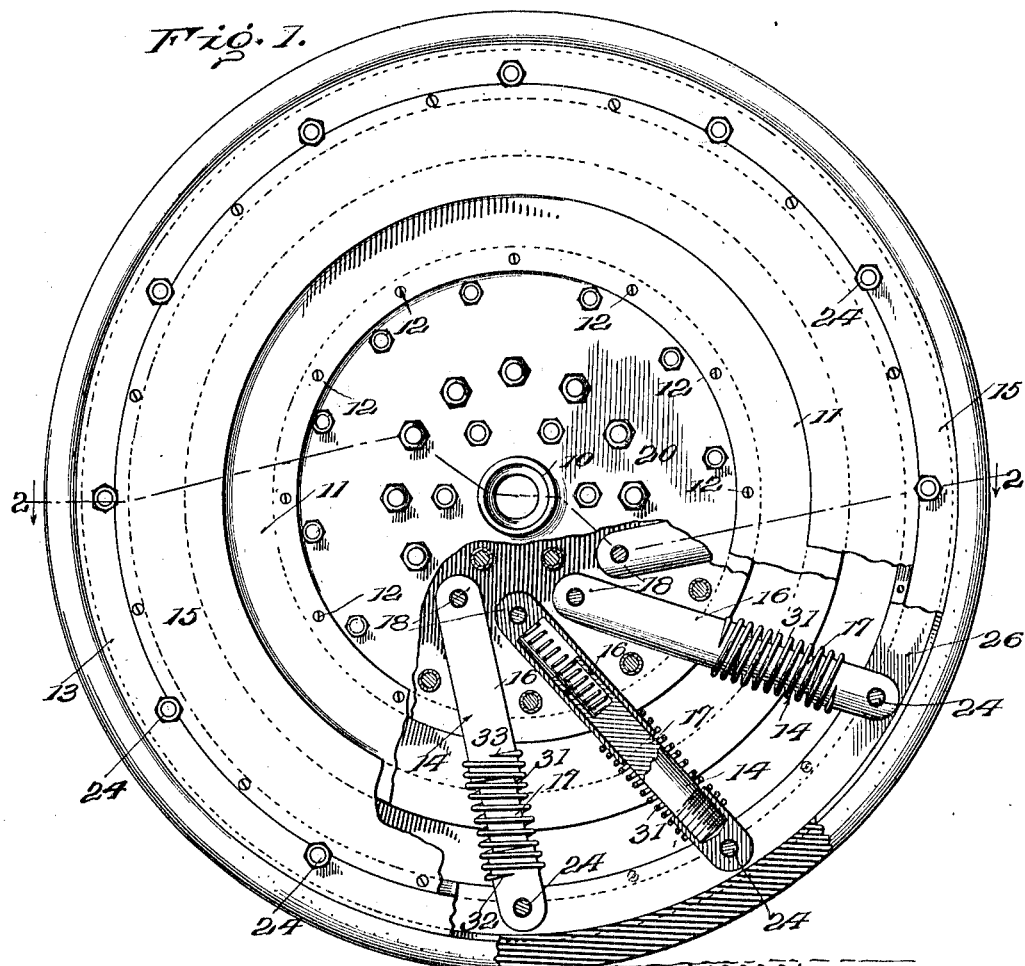
Figure 2:
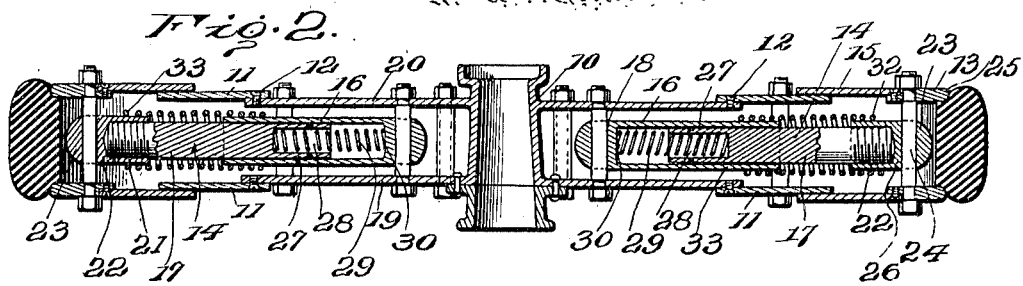

In the drawings: Figure 1 is a side elevation of a wheel, one of the side plates being partially broken away to illustrate the arrangement of the spokes; Fig. 2 is a section on the line 2—2 of Fig. 1.

In the drawings, 10 designates the hub of the wheel to which is secured plates 11. These plates 11 are secured to both sides of the hub, screws 12 passing through the plates and the hub. The rim 13, which may be of any suitable construction and provided with any form of tire, is supported in spaced relation with respect to the hub by the spokes 14, which will be hereinafter described.

A plurality of plates 15 are bolted or otherwise secured to the rim, said plates overlapping the plates 11 which are secured to the hub, the plates 11 and 15 sliding one upon the other as the hub assumes an eccentric position with respect to the rim.

The spokes 14 consist of the telescoping members 16 and 17. The female member 16 is provided with a rounded aperture terminal 18 which is disposed between the walls 19 and 20 of the hub. The male members 17 have their terminals 21 threaded within sockets 22 which are formed with the rounded portions 23, said rounded portions being apertured to receive bolts 24 which pass through the spaced portions 25 and 26 of the rim. The terminals 27 of the male members 17, which are disposed within the female members 16, are provided with sockets 28 and disposed within said sockets are coiled springs 29, the terminals of said springs remote from the members 17 contacting with the portions 30 of the female members, the springs having a normal tendency to space the members.

A spring 31 is coiled about the members 16 and 17, the terminal 32 of said spring being secured to the socket member 22, its other terminal 33 being secured to the female member 16 adjacent its open end. This spring has a tendency to draw the male and female members together, thereby projecting the male member within the female member. Thus, it will be noted that the two springs exert an opposite tendency and hold the members in spaced relation, providing a cushion which will resist the pressure of the load and, at the same time, permit the hub to move with respect to the rim. It will also be noted that as the load is applied to the axle, the springs will cushion the movement of the hub and the space 34 between the members forms a "dash-pot" which provides an additional cushioning means and takes up sudden jars occasioned by the wheel passing over an obstruction. Thus, the springs are relieved of jars which would tend to weaken or disarrange them.

The spokes are disposed tangentially with respect to the hub, their rounded terminals being disposed at the same distance from the center of the hub. It will be noted by this construction, that when the load is applied it will not act in a direct vertical line on the spokes, that is, the pressure will not be directed on the terminal of the female member as would be the case if the spokes radiated from the center of the hub. Particular attention is called to this manner of mounting the spokes with respect to the hub and rim, as by this construction the load exerts a twisting action as well as a tendency to dispose the hub eccentrically with respect to the rim. It will therefore be seen that the hub is effectually cushioned with respect to the rim without violent jarring of the cushioning means which occurs when the spring means is disposed radially from the center of the hub.

The many advantages of a construction of this character will be clearly apparent, as it will be noted that the spokes may be easily and economically manufactured and readily assembled on the wheel, the arrangement being such that a spoke may be removed and replaced without disturbing the adjacent spokes.

Having thus described my invention, what

I claim as new and desire to secure by Letters Patent is:—

1. A resilient wheel comprising a hub portion, spaced plates carried by the hub portion, a series of bolts connecting said plates adjacent the hub portion, sleeves rotatably mounted on said bolts and extending tangentially with respect to the hub, annular plates secured to the first-mentioned plates adjacent their outer edges, a rim including spaced plates, bolts connecting said plates, socket members pivotally supported on said bolts, plungers threaded in said socket members, said plungers being disposed within the sleeves which are supported by the first-mentioned bolts, the ends of the plungers which are disposed within said sleeves being bored, a spring interposed between said plungers and the end-walls of the sleeves which are mounted on the bolts, the space between said plungers and said walls constituting an air chamber, and a spring secured to the sockets which are mounted on the second mentioned bolts, said spring embracing the plungers and a portion of the sleeves, the terminal of the convolution of said springs remote from the socket being secured to the sleeve.

2. A resilient wheel comprising a hub, a plurality of plates formed integral with the hub, said plates being disposed in spaced relation, annular plates secured to the first-mentioned plates at their edges, a rim including spaced tire supported plates, bolts passing through the plates which are supported by the hub, bolts passing through the tire supporting plates, socket members pivotally mounted on the last-mentioned bolts, plungers adjustably mounted in said socket members, sleeves pivotally mounted on said bolts and supported by the hub-plates, said plungers extending within said sleeves, resilient means for normally spacing the sleeves and plungers, and contractile springs secured to the sleeves and socket members and embracing the plungers.

In testimony whereof I affix my signature in presence of two witnesses.

KARL D. SAULPAW. [L. S.]

Witnesses:
T. B. SAULPAW,
R. H. CARMICHAEL.

---

Copies of this patent may be obtained for five cents each, by addressing the "Commissioner of Patents, Washington, D. C."